United States Patent
Lee et al.

(10) Patent No.: US 8,280,182 B2
(45) Date of Patent: Oct. 2, 2012

(54) IMAGE PROCESSING METHOD OF NOISE REDUCTION AND APPARATUS THEREOF

(75) Inventors: Chi-Feng Lee, Hsinchu County (TW); Shih-Tse Chen, Taoyuan County (TW)

(73) Assignee: SONIX Technology Co., Ltd., Hsinchu (TW)

( * ) Notice: Subject to any disclaimer, the term of this patent is extended or adjusted under 35 U.S.C. 154(b) by 1020 days.

(21) Appl. No.: 12/253,247

(22) Filed: Oct. 17, 2008

(65) Prior Publication Data

US 2010/0027898 A1    Feb. 4, 2010

(30) Foreign Application Priority Data

Jul. 29, 2008  (TW) ................................ 97128687 A

(51) Int. Cl.
  *G06K 9/40*  (2006.01)
  *G06K 9/46*  (2006.01)
(52) U.S. Cl. .................... 382/260; 382/236; 382/275
(58) Field of Classification Search .................. 382/260, 382/275
  See application file for complete search history.

(56) References Cited

U.S. PATENT DOCUMENTS

| | | | |
|---|---|---|---|
| 5,877,813 A | 3/1999 | Lee et al. | |
| 6,281,942 B1 * | 8/2001 | Wang | 348/607 |
| 7,260,148 B2 * | 8/2007 | Sohm | 375/240.16 |
| 7,817,717 B2 * | 10/2010 | Malayath et al. | 375/240.16 |
| 8,107,535 B2 * | 1/2012 | Woods et al. | 375/240.16 |
| 2003/0169820 A1 | 9/2003 | Babonneau et al. | |
| 2005/0094899 A1 * | 5/2005 | Kim et al. | 382/300 |
| 2005/0207494 A1 * | 9/2005 | Ahn et al. | 375/240.16 |
| 2006/0103765 A1 | 5/2006 | Zhou et al. | |
| 2006/0198441 A1 * | 9/2006 | Chi | 375/240.16 |
| 2006/0221252 A1 | 10/2006 | Zhou et al. | |
| 2007/0070250 A1 | 3/2007 | Zhou et al. | |
| 2008/0095460 A1 | 4/2008 | Park et al. | |
| 2008/0291298 A1 * | 11/2008 | Kim et al. | 348/241 |
| 2011/0235714 A1 * | 9/2011 | Park et al. | 375/240.16 |

FOREIGN PATENT DOCUMENTS

| | | |
|---|---|---|
| CN | 1599446 | 3/2005 |
| CN | 1770880 | 5/2006 |
| CN | 1901620 | 1/2007 |

OTHER PUBLICATIONS

"1st Office Action of China counterpart application", issued on Jul. 24, 2009, p. 1-p. 9.
"Office Action of Taiwan Counterpart Application", issued on Dec. 28, 2011, p. 1-p. 11.

* cited by examiner

*Primary Examiner* — Bhavesh Mehta
*Assistant Examiner* — Utpal Shah
(74) *Attorney, Agent, or Firm* — Jianq Chyun IP Office

(57) ABSTRACT

An image processing method of noise reduction and an apparatus thereof are disclosed herein. In the image processing method, a current image having a plurality of image blocks is provided. A first block of the image blocks of the current image is substrate by the first block of at least one previous image for obtaining a difference block. Next, the difference block is performed on a motion detection process for determining whether the first block of the current image is in a static state. When the first block of the current image is in the static state, the first block of the current image is performed on a temporal filtering process for reducing the noise. By analyzing the static state, occurrence of motion blur can be prevented.

19 Claims, 4 Drawing Sheets

IMAGE PROCESSING METHOD OF NOISE REDUCTION AND APPARATUS THEREOF

CROSS-REFERENCE TO RELATED APPLICATION

This application claims the priority benefit of Taiwan application serial no. 97128687, filed on Jul. 29, 2008. The entirety of the above-mentioned patent application is hereby incorporated by reference herein and made a part of specification.

BACKGROUND OF THE INVENTION

1. Field of the Invention

The present invention relates to an image processing method and an apparatus thereof. More particularly, the present invention relates to an image processing method for noise reduction, and an apparatus thereof.

2. Description of Related Art

With development of multi-media technique, demand of high quality images by people is increased. However, a main factor that influences the quality of an image is noises generated during image capturing, signal conversion and signal transmission. Therefore, an image processing technique has to be applied to eliminate the noises that influence visual feelings of human eyes. Commonly used image processing methods for noise reduction include a spatial noise-reduction process and a temporal noise-reduction process.

The spatial noise-reduction process applies a filter having local window blocks to perform spatial filtering process to pixels of a current image, so as to smooth and soften the image, and accordingly a visual perception of the noises by human eyes can be reduced. However, such method generally leads to an image blur effect, which may influence presenting of image details, for example, edges and textures.

The temporal noise-reduction process references information of a previous image to perform temporal filtering process to the pixels of the current image. Since the current image is highly related to the previous image, compared to the spatial noise-reduction process, the temporal noise-reduction process can maintain and reserve details of the image. However, when the temporal filtering process is performed to a moving object within the image, a motion blur phenomenon is liable to be generated, which can cause an uncomfortable feeling of human eyes. Therefore, a motion estimation algorithm is provided to estimate a motion vector trend of the whole image, so as to adjust an intensity of the temporal filtering for eliminating the motion blur. However, the motion estimation algorithm is complicated and requires a large amount of calculation, and it is hard to achieve a real-time processing of the current image when the motion estimation algorithm is implemented by hardware. Moreover, degree of image distortion that can be born by human eyes is varied according to environmental light source and image variations, so that during the noise-reduction process, besides the motion blur is required to be avoided, influences of the environmental light source and image characteristics are also taken into consideration.

SUMMARY OF THE INVENTION

The present invention is directed to an image processing method and an apparatus thereof, which may process image blocks of a current image in real-time, so as to eliminate noises of the image blocks and avoid occurrence of motion blur.

The present invention provides an image processing method. The method can be described as follows. First, a current image having a plurality of image blocks is received. Next, a first block of the image blocks of the current image is subtracted by the first block of at least one previous image for obtaining a difference block. Next, a motion detection process is performed to the difference block for determining whether the first block of the current image is in a static state. Finally, a temporal filtering process is performed to the first block of the current image and the first block of the previous image, if the first block of the current image is in the static state.

In an embodiment of the present invention, the motion detection process is to judge whether the first block of the current image is in the static state according to a comparison result between a statistic value of the difference block and a threshold value.

In an embodiment of the present invention, the motion detection process is to analyze a bit map of the difference block to obtain a smoothness of the difference block, and judge whether the first block of the current image is in the static state according to a comparison result between the smoothness and a second threshold value.

In an embodiment of the present invention, whether the first block of the current image is in a low environmental light state is judged according to a comparison result between a first average value of the first block of the current image and an environmental light threshold value. When the first block of the current image is in the low environmental light state, a state count is accumulated. When the state count is greater than a third threshold value, the motion detection process is interrupted, and a majority decision process is performed to the first block of the current image, so as to judge whether the first block of the current image is in the static state.

The present invention provides another image processing method. The method can be described as follows. First, a display frame is divided into a plurality of image blocks, wherein the image blocks include a first block. Next, a first image and a second image are sequentially received, and the first image of the first block and the second image of the first block are compared to obtain a difference block. Next, the first image of the first block is judged to be in a static state according to the difference block, and a temporal filtering process is performed to the first image of the first block and at least the second image of the first block.

The present invention provides an image processing apparatus including a difference calculation module, a motion detection module and a temporal filtering module. The difference calculation module receives a first block of a plurality of image blocks within a current image, and subtracts the first block of the current image by the first block of at least one previous image for obtaining a difference block, wherein each of the image blocks has a plurality of pixels. The motion detection module is coupled to the difference calculation module for performing a motion detection process to the difference block, so as to judge whether the first block of the current image is in a static state and generate a first control signal. The temporal filtering module is coupled to the motion detection module, and is controlled by the first control signal, wherein when the first block of the current image is in the static state, the temporal filtering module performs a temporal filtering process to the first block of the current image and the first block of at least one previous image.

In an embodiment of the present invention, the motion detection module includes a statistic analysis unit and a decision unit. The statistic analysis unit calculates a statistic value of the difference block. The decision unit is coupled to the statistic analysis unit for judging whether the first block of the current image is in the static state according to a comparison result between the statistic value and a first threshold value, so a to generate the first control signal.

In an embodiment of the present invention, the motion detection module includes a statistic analysis unit and a decision unit. The statistic analysis unit analyzes a bit map of the difference block to obtain a smoothness of the difference block. The decision unit is coupled to the statistic analysis unit for judging whether the first block of the current image is in the static state according to a comparison result between the smoothness and a second threshold value, so a to generate the first control signal.

In an embodiment of the present invention, the image processing apparatus further includes an exception processing module including a counting unit and a majority decision unit. The counting unit judges whether the first block of the current image is in a low environmental light state according to a comparison result between a first average of the first block of the current image and an environmental light threshold value, and accumulates a state count when the first block of the current image is in the low environmental light state. The majority decision unit is coupled to the counting unit. When the state count is greater than a third threshold value, the majority decision unit generates a second control signal to interrupt the motion detection process, and judges whether the first block of the current image is in the static state according to states of a predetermined proportion of the image blocks of the current image, so as to generate the first control signal.

In the present invention, the states of the image blocks of the current image are judged via the motion detection process, and the temporal filtering process is performed to the image blocks having the static state, so as to eliminate the noises of the image blocks and avoid occurrence of the motion blur. During the motion detection process, according to the image processing method and the apparatus thereof, the state of the image block is judged according to statistic information of block. Moreover, since the environmental light source and the characteristics of the image blocks can influence a degree of image distortion that can be born by human eyes, the states of the image blocks are judged with reference of the environmental light source and the characteristics of the image blocks. The current image can be processed in real-time application due to a low calculation complexity of the image processing method and the apparatus thereof.

In order to make the aforementioned and other objects, features and advantages of the present invention comprehensible, a preferred embodiment accompanied with figures is described below in detail.

BRIEF DESCRIPTION OF THE DRAWINGS

The accompanying drawings are included to provide a further understanding of the invention, and are incorporated in and constituted a part of this specification. The drawings illustrate embodiments of the invention and, together with the description, serve to explain the principles of the invention.

DESCRIPTION OF EMBODIMENTS

During an image capturing process or an image transmission process, generation of noise interference is inevitable, so that presentation of images is accordingly influenced. Therefore, an image processing method (such as a temporal filtering process) is generally applied to eliminate the noises. The temporal filtering process performs the filtering process to the current image with reference of information of a previous image, so as to eliminate the noises. However, during noise-reduction of a moving object within the image, motion blur is liable to be generated, which may cause an uncomfortable feeling of human eyes.

Since human eyes are used to trace the moving object within the image, and notice a moving state of the moving object, noises of the moving object within the image can be unperceivable. Therefore, based on characteristics of a human visual system, in the present embodiment, whether each of image blocks of the image is in a static state is judged via a motion detection process, and the temporal filtering process is performed to the image blocks in the static state, so as to eliminate the noises and reduce a chance of motion blur.

Figure 1:
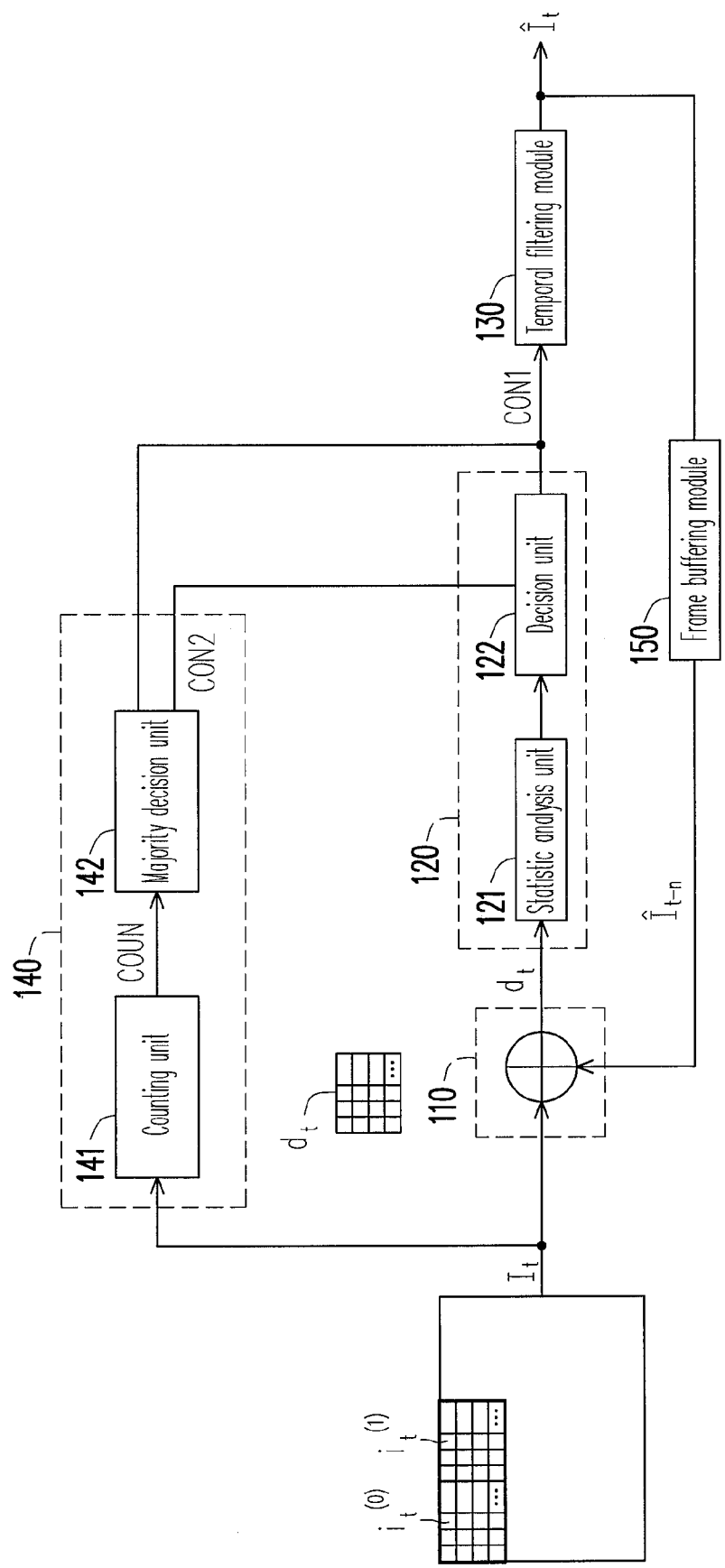
FIG. 1 is a schematic diagram illustrating an image processing apparatus according to an embodiment of the present invention.

FIG. 1 is a schematic diagram illustrating an image processing apparatus according to an embodiment of the present invention. Referring to FIG. 1, the image processing apparatus 100 includes a difference calculation module 110, a motion detection module 120, a temporal filtering module 130, an exception processing module 140, and a frame buffering module 150. A current image $I_t$ has a plurality of non-overlapped image blocks $i_t^{(0)}, i_t^{(1)}, \ldots i_t^{(k)}, \ldots$, and each of the image blocks has a plurality of pixels, for example, 8×8 pixels. In the present embodiment, image processing is performed to each of the image blocks, and the image block $i_t^{(1)}$ of the current image $I_t$ is taken as an example.

The difference calculation module 110 receives the image block $i_t^{(1)}$ of the current image $I_t$, and subtracts the image block $i_t^{(1)}$ of the current image $I_t$ by an image block $\hat{i}_{t-n}^{(1)}$ of at least one previous image $\hat{I}_{t-n}$ to obtain a difference block $d_t^{(1)}$. Namely, $d_t^{(1)}(x,y)=i_t^{(1)}(x,y)-\hat{i}_{t-n}^{(1)}(x,y)$, wherein the coordinates (x,y) represent a position of the pixel within the image block. Here, the previous image $\hat{I}_{t-n}$ represents an n-th image previous to the current image $I_t$, for example, n=1, and the image block $\hat{i}_{t-n}^{(1)}$ is an image block within the previous image $\hat{I}_{t-n}$ that has a same position with that of the image block $i_t^{(1)}$. The motion detection module 120 is coupled to the difference calculation module 110. The motion detection module 120 performs the motion detection process to the difference block $d_t^{(1)}$ for judging whether the image block $i_t^{(1)}$ is in a static state, and generating a control signal CON1.

The temporal filtering module 130 is coupled to the motion detection module 120 for determining whether to perform the temporal filtering process to the image block $i_t^{(1)}$ and the image block $\hat{i}_{t-n}^{(1)}$ according to the control signal CON1. When the image block $i_t^{(1)}$ is in the static state, weight calculations are then performed to the pixels contained within the image block $i_t^{(1)}$ respectively with the pixels contained within the image block $\hat{i}_{t-n}^{(1)}$ under control of the temporal filtering module 130. For example, $\hat{i}_t^{(1)}(x,y)=\lambda i_t^{(1)}(x,y)+(1-\lambda)\times \hat{i}_{t-n}^{(1)}(x,y)$, wherein $\lambda$ is a weight coefficient, and $\hat{i}_t^{(1)}(x,y)$ represents temporal filtering processed pixels in the image block $i_t^{(1)}$.

It should be noted that in the present embodiment, whether the image block $i_t^{(1)}$ is in the static state can be judged with reference of the image blocks $\hat{i}_{t-n}^{(1)}$ of a plurality of the previous images $\hat{I}_{t-n}$, and with reference of the image blocks $\hat{i}_{t-n}^{(1)}$ of a plurality of the previous images $\hat{I}_{t-n}$, the temporal filtering process is performed to the image blocks $i_t^{(1)}$ judged to be in the static state. Therefore, the present embodiment is not limited to an application of just applying a single previous image.

The motion detection module 120 includes a statistic analysis unit 121 and a decision unit 122. The statistic analysis unit 121 calculates a statistic value of the difference block $d_t^{(1)}$, for example, one of an average, a standard deviation, a sum of absolute difference (SAD) and a correlation, or a combination thereof. A difference between the image block $i_t^{(1)}$ and the image block $\hat{i}_{t-n}^{(1)}$ can be obtained via the statistic analysis. For example, the smaller the average, the standard deviation or the SAD of the difference block $d_t^{(1)}$ is, the smaller the difference between the image block $i_t^{(1)}$ and the image block $\hat{i}_{t-n}^{(1)}$ is. The greater the correlation of the difference block $d_t^{(1)}$ is, the smaller the difference between the image block $i_t^{(1)}$ and the image block $\hat{i}_{t-n}^{(1)}$ is.

When the difference between the image block $i_t^{(1)}$ and the image block $\hat{i}_{t-n}^{(1)}$ is relatively small, the two image blocks can be intuitively judged to be similar. Namely, the image block $i_t^{(1)}$ is in the static state. Conversely, it can be judged that the image block $i_t^{(1)}$ has a moving object, so that the image block $i_t^{(1)}$ is not in the static state. The decision unit 123 is coupled to the statistic analysis unit 121 for judging whether the image block $i_t^{(1)}$ is in the static state according to a comparison result between the statistic value and a threshold value T1, so as to generate the control signal CON1. Since when the temporal filtering process is performed to the image block that is not in the static state, the motion blur can be generated, the temporal filtering module 130 only performs the temporal filtering process to the image block in the static state, so as to avoid the motion blur.

It should be mentioned that the image blocks located adjacent to the current image block $i_t^{(k)}$ can be referred to judge the state of the current image block $i_t^{(k)}$ for ensuring an accuracy of judging state since the said image blocks located adjacent to the current image block $i_t^{(k)}$, such as the image blocks located at left, top, top-left and top-right of the current image block $i_t^{(k)}$, have relatively high correlation with the current image block $i_t^{(k)}$.

The frame buffering module 150 is coupled between the temporal filtering module 130 and the difference calculation module 110 for storing the processed image blocks, and providing the image block having a same position within the previous image to the difference calculation module 110, when the noise-reduction image process is performed to the image block of a next image. The exception processing module 140 includes a counting unit 141 and a majority decision unit 142. Generally, under different environmental light sources, noise degrees perceived by human eyes are different. If the image block in the low environmental light source has a relatively low gray level (i.e. the image block is relatively dark), the accuracy for judging the static state via the motion detection process may be relatively low. Therefore, considering an influence of the low environmental light source, in the present embodiment, an environmental light threshold value is set for estimating the gray level of the image block. In other words, an acceptable lower limit of the gray level of the image block is set.

Therefore, the counting unit 141 judges whether the image block $i_t^{(1)}$ is under a low environmental light state according to a comparison result between an average of the image block $i_t^{(1)}$ and the environmental light threshold value. When the image block $i_t^{(1)}$ is under the low environmental light state, the counting unit 141 accumulates a state count COUN. The majority decision unit 142 is coupled to the counting unit 141. When the state count COUN is greater than a threshold value T3, the majority decision unit 142 generates a control signal CON2 to interrupt the motion detection process, and performs a majority decision process to the image block $i_t^{(1)}$, so as to judge whether the image block $i_t^{(1)}$ is in the static state and generate the control signal CON1. Namely, the majority decision unit 142 judges whether the image block $i_t^{(1)}$ is in the static state according to states of majority processed image blocks in the current image $I_t$.

For example, when a predetermined proportion of the images blocks within the current image $I_t$ are in the static state, the majority decision unit 142 then judges the image block $i_t^{(1)}$ is in the static state. When the predetermined proportion of the images blocks within the current image $I_t$ are not in the static state, the majority decision unit 142 then judges the image block $i_t^{(1)}$ is not in the static state. When a majority processed image blocks is judged to be in the static state (or not in the static state), the presently processed image block $i_t^{(1)}$ is probably in the static state (or not in the static state). By such means, calculation amount and complexity for the motion detection process can be reduced. Moreover, in the majority decision processing, an accuracy for judging the static state can be ensured according to states of the image blocks located adjacent to the image block $i_t^{(1)}$.

During the motion detection process, the difference between the image block $i_t^{(k)}$ and the image block $\hat{i}_{t-n}^{(k)}$ can be obtained via the statistic value of the difference block $d_t^{(k)}$, the difference between the image block $i_t^{(k)}$ and the image block $\hat{i}_{t-n}^{(k)}$ can also be obtained by analyzing a bit map of the difference block $d_t^{(k)}$ by the statistic analysis unit 121. Since 8 bits are generally used for representing the gray level of a pixel, the image block has a plurality of bit maps corresponding to different bits, and in each of the bit maps, 0 or 1 is used for representing the pixels in the image block.

The difference block $d_t^{(k)}$ is a result obtained by subtracting the image block $\hat{i}_{t-n}^{(k)}$ from the image block $i_t^{(k)}$, so that the statistic analysis unit 121 can analyze a least significant bit (LSB) map of the difference block $d_t^{(k)}$ to obtain a smoothness of the difference block $d_t^{(k)}$. Wherein, the smoothness represents a distribution trend of the differences between the image block $i_t^{(k)}$ and the image block $\hat{i}_{t-n}^{(k)}$. For example, the smoothness is a proportion of the pixels represented by 0 or 1 to all of the pixels in the difference block. When the smoothness of the difference block $d_t^{(k)}$ is relatively great, it represents difference distribution between the image block $i_t^{(k)}$ and the image block $\hat{i}_{t-n}^{(k)}$ is relatively accordant. Conversely, the difference distribution between both of them is not accordant.

For example, if the proportion of the pixels represented by 0 or 1 to all of the pixels in the difference block (i.e. the smoothness) is without a range of 0.4-0.6, it represents the difference distribution between the image block $i_t^{(k)}$ and the image block $\hat{i}_{t-n}^{(k)}$ is accordant. Conversely, if the proportion of the pixels represented by 0 or 1 to all of the pixels in the difference block (i.e. the smoothness) is close to 0.5 (or within the range of 0.4-0.6), it represents the difference distribution between the image block $i_t^{(k)}$ and the image block $\hat{i}_{t-n}^{(k)}$ is not accordant. Therefore, the decision unit 122 judges whether the image block $i_t^{(k)}$ is in the static state according to the comparison result between the smoothness and a threshold value T2, so as to generate the control signal CON1.

During the motion detection process, the statistic analysis unit 120 calculates a just noticeable distortion (JND) matched to the human visual system (HVS) according to an average $A_t^{(k)}$ of the image block $i_t^{(k)}$ to serve as a referenced threshold value for the decision unit 122. Sensitivities of human eyes for the images with different gray levels are different, and the JND is a distortion that can be born by the human eyes. Namely, when the statistic value of the difference block $d_t^{(k)}$ (for example, the SAD) is greater than the JND, it represents the difference between the image block $i_t^{(k)}$ and the image block $\hat{i}_{t-n}^{(k)}$ is probably caused by the moving object within the image, and therefore the decision unit 122 judges that the image block $i_t^{(k)}$ is not in the static state. Conversely, when the statistic value of the difference block $d_t^{(k)}$ (for example, the SAD) is less than or equal to the JND, it represents the difference between the image block $i_t^{(k)}$ and the image block $\hat{i}_{t-n}^{(k)}$ is probably caused by noises, and a distortion thereof can be accepted by human eyes, so that the decision unit 122 judges the image block $i_t^{(k)}$ is in the static state. The JND can be represented by a mathematic equation as follows:

$$JND(A_t^{(k)}) = \begin{cases} T_0 \times \left(1 - \sqrt{A_t^{(k)}/127} + k_1\right), & A_t^{(k)} \leq 127 \\ \gamma \times \left(A_t^{(k)} - 127\right) + k_2, & A_t^{(k)} > 127 \end{cases}$$

Wherein the parameters T0, γ, $k_1$ and $k_2$ can be adjusted according to different perceptions of human eyes and different environmental light sources. Accordingly, the referenced threshold value for the decision unit 122 can be adaptively adjusted according to the average $A_t^{(k)}$ of the image block $i_t^{(k)}$.

In the present embodiment, methods for the motion detection process are provided. A first method is to judge whether the image block $i_t^{(k)}$ of the current image $I_t$ is in the static state according to a comparison result between the statistic value of the difference block $d_t^{(k)}$ and the threshold value T1. A second method is to analyze the bit map of the difference block $d_t^{(k)}$ to obtain the smoothness of the difference block $d_t^{(k)}$, and judge whether the image block $i_t^{(k)}$ is in the static state according to a comparison result between the smoothness and the threshold value T2. A third method is to judge whether the image block $i_t^{(k)}$ is in the static state according to a comparison result between the statistic value of the difference block $d_t^{(k)}$ and the JND ($A_t^{(k)}$) matched to the HVS, wherein the JND ($A_t^{(k)}$) is calculated based on the average $A_t^{(k)}$ of the image block $i_t^{(k)}$.

Whether the image block $i_t^{(k)}$ is in the static state can be judged by those skilled in the art according to one of the aforementioned motion detection processes or a combination thereof. For example, if the image block $i_t^{(k)}$ is judged to be in the static state via one of the motion detection process method, whether the image blocks $i_t^{(k)}$ is really in the static state can be ensured via another motion detection process method. Moreover, in the present embodiment, whether the image block $i_t^{(k)}$ is in the static state is mainly judged based on the motion detection process, and the temporal filtering process is further performed to the image blocks in the static state, so as to avoid the motion blur. However, the present invention is not limited to the aforementioned three motion detection processes. Those skilled in the art can also judge whether the image block $i_t^{(k)}$ is in the static state via other methods. For example, a motion vector of the image block $i_t^{(k)}$ is obtained via a motion estimation algorithm, and whether the image block $i_t^{(k)}$ is in the static state can be judged according to a distribution of the motion vector of the image block $i_t^{(k)}$.

Figure 2:
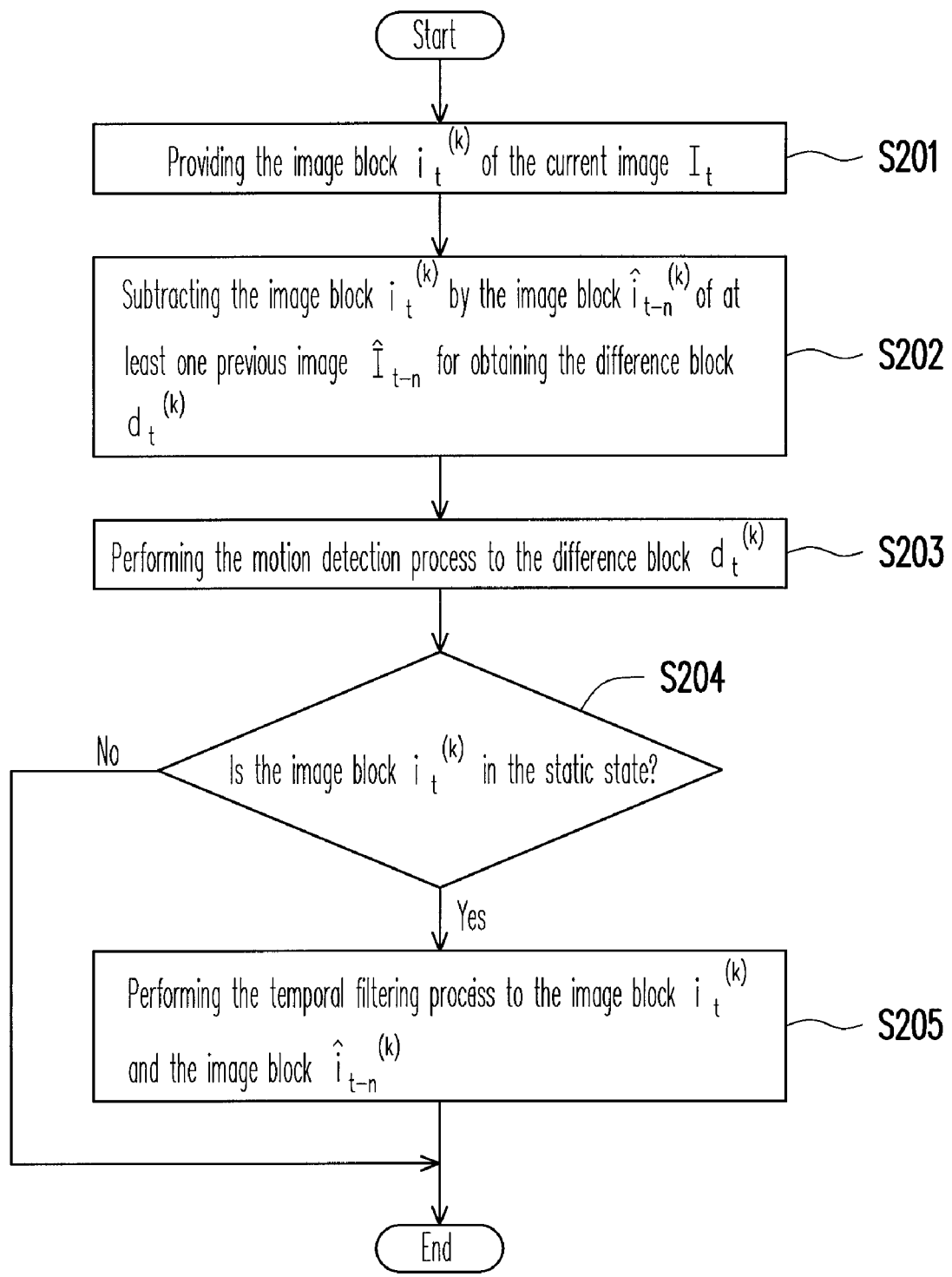
FIG. 2 is a flowchart illustrating an image processing method according to an embodiment of the present invention.

According to the above description, a flowchart of the image processing method is deduced as follows. FIG. 2 is a flowchart illustrating an image processing method according to an embodiment of the present invention. In the present invention, the image block is taken as a unit for performing the noise-reduction image processing to the current image.

Referring to FIG. 1 and FIG. 2, when the image block $i_t^{(k)}$ of the current image $I_t$ is provided (step S201), the image block $i_t^{(k)}$ is subtracted by the image block $\hat{i}_{t-n}^{(k)}$ of at least one previous image $\hat{I}_{t-n}$ for obtaining the difference block $d_t^{(k)}$ (step S202), wherein the current image $I_t$ can be provided by a memory, such as frame buffer, or a pre-processor. Next, the motion detection process is performed to the difference block $d_t^{(k)}$ for determining whether the image block $i_t^{(k)}$ is in the static state (step S203). When the image block $i_t^{(k)}$ is in the static state (step S204), the temporal filtering process is performed to the image block $i_t^{(k)}$ and the image block $\hat{i}_{t-n}^{(k)}$ for eliminating the noise in the image block $i_t^{(k)}$ (step S205). Conversely, when the image block $i_t^{(k)}$ is not in the static state (step S204), the temporal filtering process is not performed to the image block $i_t^{(k)}$ for reducing occurrence of the motion blur.

As shown in FIG. 1, during the motion detection process, the difference between the image block $i_t^{(k)}$ and the image block $\hat{i}_{t-n}^{(k)}$ can be obtained according to a comparison result between the statistic value of the difference block $d_t^{(k)}$ and the threshold value T1, so as to judge whether the image block $i_t^{(k)}$ is in the static state, wherein the statistic value can be one of an average, a standard deviation, a SAD and a correlation of the image block $i_t^{(k)}$, or a combination thereof. Moreover, during the motion detection process, the smoothness of the difference block $d_t^{(k)}$ can also be obtained by analyzing the bit map of the difference block $d_t^{(k)}$. A distribution trend of the difference between the image block $i_t^{(k)}$ and the image block $\hat{i}_{t-n}^{(k)}$ can be obtained according to the smoothness. Therefore, whether the image block $i_t^{(k)}$ is in the static state can be judged according to the comparison result between the smoothness and the threshold value T2. Moreover, during the motion detection process, whether the difference between the image block $i_t^{(k)}$ and the image block $\hat{i}_{t-n}^{(k)}$ is caused by the moving object or the noise interference can be judged according to the comparison result between the statistic value of the difference block $d_t^{(k)}$ and the JND matched to the HVS, so as to judge whether the image block $i_t^{(k)}$ is in the static state. Certainly, in the present embodiment, whether the image block $i_t^{(k)}$ is in the static state can be judged according to one of the aforementioned motion detection processes or a combination thereof.

Figure 3:
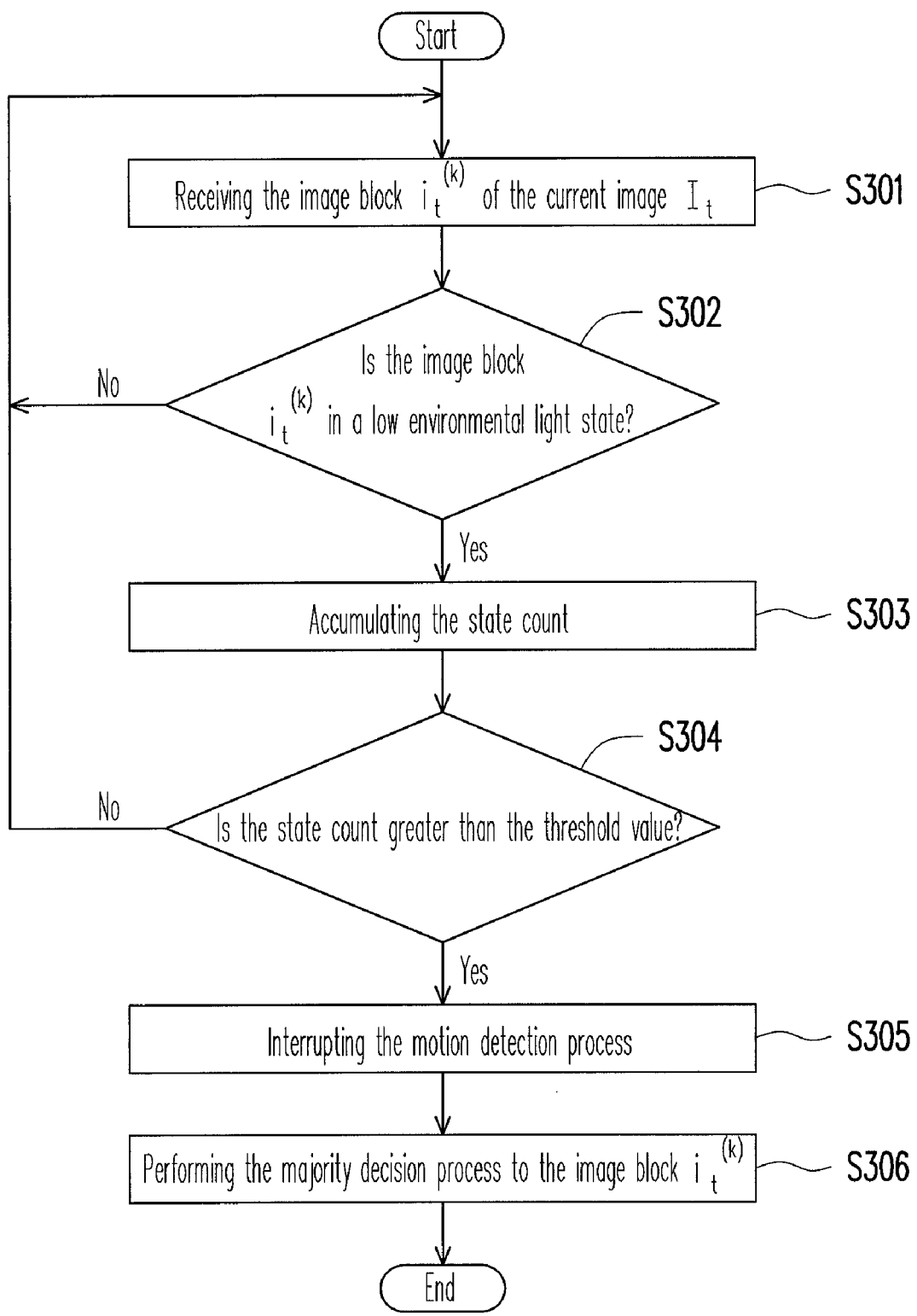
FIG. 3 is a flowchart illustrating an image processing method according to an embodiment of the present invention.

In advance, considering that the environmental light source can influence the perception of noise interference by human eyes, and under a low environmental light source, when the relatively dark image block $i_t^{(k)}$ is processed by the motion detection process, a state thereof can be misjudged. Therefore, in another embodiment of the present invention, whether the image block $i_t^{(k)}$ is in the static state is judged with reference of the state of the processed image block. FIG. 3 is a flowchart illustrating an image processing method according to an embodiment of the present invention. Referring to FIG. 1 and FIG. 3, when the image block $i_t^{(k)}$ of the current image $I_t$ is received (step S301), whether the image block $i_t^{(k)}$ is in a low environmental light state is judged according to a comparison result between an average of the image block $i_t^{(k)}$ and an environmental light threshold value L1 (step S302). If the image block $i_t^{(k)}$ is in the low environmental light state, the state count COUN is accumulated (step S303). Conversely, a next image block is processed. When the state count COUN is greater than the threshold value T3 (step S304), it represents most of the processed image blocks are in the low environment light state, and now the motion detection process of FIG. 2 is interrupted (step S305), so as to avoid misjudgement of the state of the image block $i_t^{(k)}$, and the majority decision process is performed to the image block $i_t^{(k)}$ (step S306).

During the majority decision process, when a predetermined proportion of the images blocks within the current image $I_t$ are in the static state, the image block $i_t^{(k)}$ is then judged to be in the static state. Deduced by analogy, when a predetermined proportion of the images blocks within the current image $I_t$ are not in the static state, the image block $i_t^{(k)}$ is then judged to be not in the static state. Moreover, since the image block $i_t^{(k)}$ generally has a high correlation with the adjacent image blocks, in the present embodiment, correctness of the majority decision process can be ensured with reference of states of the adjacent image blocks. Generally, a processing sequence of the image blocks in the current image $I_t$ is raster scanning, so that the image blocks adjacent to the image block $i_t^{(k)}$ can be located at left, top, top-left and top-right of the image block $i_t^{(k)}$.

In the embodiment of FIG. 3, the master control right is transferred to the majority decision process by interrupting the motion detection process for avoiding the judgement result derived from the motion detection process is directly used to serve as the determined state of the image block $i_t^{(k)}$. In the said embodiments of FIG. 2 and FIG. 3, the state of the image block can be judged by referring the judgement result of the motion detection process and/or the judgement result of the majority decision process.

Figure 4:
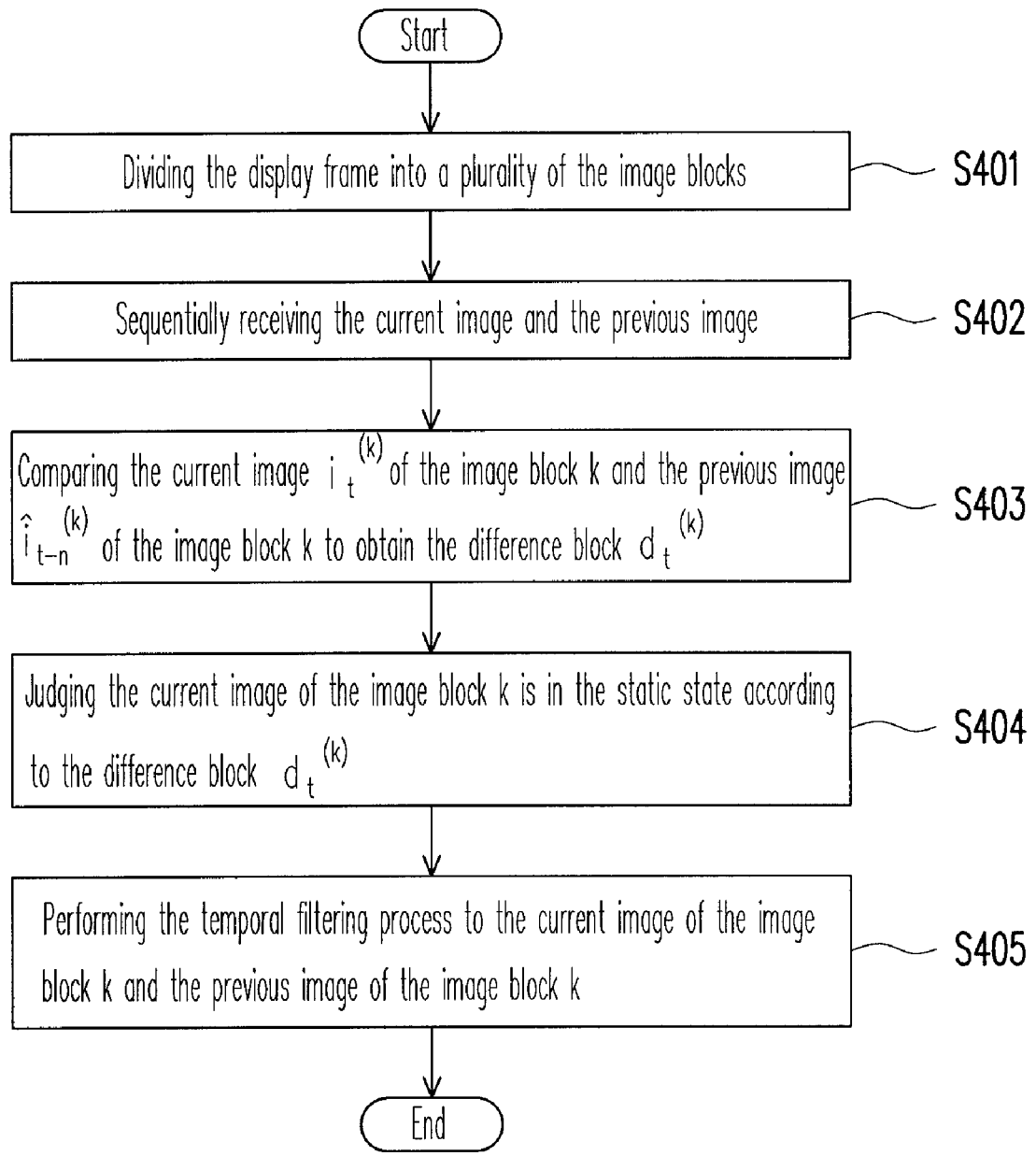
FIG. 4 is a flowchart illustrating an image processing method according to an embodiment of the present invention.

In the embodiment of FIG. 2, the image is composed of a plurality of the non-overlapped image blocks, though methods for dividing the image are not limited. People ordinary skilled in the art should know that the image can be divided into image blocks having the same size or different sizes according to scenes contained within the image. FIG. 4 is a flowchart illustrating an image processing method according to an embodiment of the present invention. Referring to FIG. 1 and FIG. 4. First, the display frame is divided into a plurality of the image blocks (step S401). For simplicity's sake, the image blocks are numbered as 0, 1, . . . , k, . . . , and the image block k is taken as an example. Next, the current image $I_t$ and the previous image $\hat{I}_{t-n}$ are sequentially received (step S402), and the current image (i.e. $i_t^{(k)}$) of the image block k and the previous image (i.e. $\hat{i}_{t-n}^{(k)}$) of the image block k are compared to obtain the difference block $d_t^{(k)}$ (step S403). A difference between the current image and the previous image is obtained by analyzing the difference block $d_t^{(k)}$, so as to judge the current image of the image block k is in the static state (step S404). Next, the temporal filtering process is performed to the current image of the image block k and at least the previous image of the image block k (step S405), so as to eliminate the noises and avoid the motion blur.

Wherein, steps of judging the current image of the image block k being in the static state according to the difference block $d_t^{(k)}$ can be referred to the description of the embodiment of FIG. 2, and detailed description thereof is not repeated. Moreover, referring to the description of the embodiment of FIG. 3, in the embodiment of FIG. 4, the current image of the image block k is also judged to be in the low environmental light state according to a comparison result between an average of the current image of the image block k and the environmental light threshold value, and the state count is accumulated. When the state count is greater than the threshold value, the current image of the image block k is judged to be in the static state according to a state of the current image of the processed image block.

In summary, in the aforementioned embodiment, the image block is taken as a unit for performing the noise-reduction image processing to the current image, in which whether the presently processed image block is in the static state is obtained based on statistic information of the difference block and characteristics of the HVS, and the temporal filtering process is further performed to the image block in the static state, so as to eliminate the noises of the image block and avoid occurrence of the motion blur. During the motion detection process, whether the image block is movable or static is not only judged by analyzing texture variation or smoothness of the difference block, local statistic information and state of the global image block are further combined to assist judgement of the static state. Moreover, the referenced threshold value can be adaptively adjusted according to variations of different image blocks or variation of the environment light source.

Since an algorithm with a lower complexity is adopted by the motion detection process for judging whether the image block is in the static state, and the image blocks required to be processed by the temporal filtering process are selected according to the judgement of the static state, a processing latency for the aforementioned image processing method and an apparatus thereof is relatively short, so that calculation loading of a processor thereof is relatively small, and real-time processing can be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method, comprising:
providing a current image, wherein the current image comprises a plurality of image blocks, and each of the image blocks has a plurality of pixels;
subtracting a first block of the image blocks of the current image by the first block of at least one previous image for obtaining a difference block;
performing a motion detection process to the difference block for determining whether the first block of the current image is in a static state, wherein the motion detection process comprises:
calculating a statistic value of the difference block;
analyzing a bit map of the difference block to obtain a smoothness of the difference block; and
judging whether the first block of the current image is in the static state according to a first comparison result between the statistic value and a first threshold value and/or a second comparison result between the smoothness and a second threshold value; and
performing a temporal filtering process to the first block of the current image and the first block of the previous image if the first block of the current image is in the static state so as to output the processed first block of the current image.

2. The image processing method as claimed in claim 1, wherein the motion detection process further comprises:
calculating a just noticeable distortion (JND) matched to a human visual system (HVS) according to a first average of the first block of the current image to serve as the first threshold value.

3. The image processing method as claimed in claim 1, further comprising:
judging whether the first block of the current image is in a low enviromnental light state according to a comparison result between a first average value of the first block of the current image and an environmental light threshold value;
accumulating a state count when the first block of the current image is in the low environmental light state; and interrupting the motion detection process when the state count is greater than a third threshold value, and performing a majority decision process to the first block of the current image, so as to judge whether the first block of the current image is in the static state.

4. The image processing method as claimed in claim 3, wherein the majority decision process comprises:
   judging the first block of the current image is in the static state when a predetermined proportion of the image blocks of the current image are in the static state; and
   judging the first block of the current image is not in the static state when the predetermined proportion of the image blocks of the current image are not in the static state.

5. The image processing method as claimed in claim 4, wherein the majority decision process further comprises:
   judging the first block of the current image is in the static state when the image blocks located adjacent to the first block of the current image are in the static state; and
   judging the first block of the current image is not in the static state when the image blocks located adjacent to the first block of the current image are not in the static state.

6. The image processing method as claimed in claim 1, further comprising:
   judging whether the first block of the current image is in the static state according to states of the image blocks located adjacent to the first block of the current image.

7. The image processing method as claimed in claim 1, wherein the temporal filtering process comprises performing weight calculations to the pixels contained within the first block of the current image respectively with the pixels contained within the first block of the previous image.

8. The image processing method as claimed in claim 1, wherein the current image is provided by a memory or a pre-processor, and the previous image is provided by the memory.

9. An image processing method, comprising:
   dividing a display frame into a plurality of image blocks, wherein the image blocks comprises a first block;
   sequentially receiving a first image and a second image;
   comparing the first image of the first block and the second image of the first block to obtain a difference block;
   calculating a statistic value of the difference block;
   analyzing a bit map of the difference block to obtain a smoothness of the difference block;
   judging the first image of the first block is in a static state according to a first comparison result between the statistic value and a first threshold value and/or a second comparison result between the smoothness and a second threshold value; and
   performing a temporal filtering process to the first image of the first block and at least the second image of the first block.

10. The image processing method as claimed in claim 9, wherein step of judging the first image of the first block is in the static state according to the difference block further comprises:
   calculating a IND matched to a HVS according to a first average of the first image of the first block to serve as the first threshold value.

11. The image processing method as claimed in claim 9, further comprising:
   judging the first image of the first block is in a low environmental light state according to a comparison result between a first average value of the first image of the first block and an environmental light threshold value;
   accumulating a state count; and
   judging the first image of the first block is in the static state according to the first image of the image blocks when the state count is greater than a third threshold value.

12. The image processing method as claimed in claim 11, further comprising:
   judging the first image of the first block is in the static state according to the first image of the image blocks located adjacent to the first block.

13. The image processing method as claimed in claim 9, further comprising:
   judging the first image of the first block is in the static state according to the first image of the image blocks located adjacent to the first block.

14. An image processing apparatus, comprising:
   a difference calculation module, configured to receive a first block of a plurality of image blocks within a current image, and subtract the first block of the current image by the first block of at least one previous image for obtaining a difference block, wherein each of the image blocks has a plurality of pixels;
   a motion detection module, coupled to the difference calculation module, and configured to perform motion detection process to the difference block, so as to judge whether the first block of the current image is in a static state and generate a first control signal
   wherein the motion detection module comprises:
   a statistic analysis unit, configured to calculate a statistic value of the difference block and analyzes a bit map of the difference block to obtain a smoothness of the difference block;
   a temporal filtering module, coupled to the motion detection module, and controlled by the first control signal, configured to perform a temporal filtering process to the first block of the current image and the first block of at least one previous image when the first block of the current image is in the static state; and
   a decision unit, coupled to the statistic analysis unit, and configured to judging whether the first block of the current image is in the static state according to a comparison result between the statistic value and a first threshold value and/or a comparison result between the smoothness and a second threshold value, so as to generate the first control signal.

15. The image processing apparatus as claimed in claim 14, wherein the statistics analysis unit calculates a JND matched to a HVS according to a first average of the first block of the current image to serve as the first threshold value.

16. The image processing apparatus as claimed in claim 14, further comprising:
   an exception processing module, comprising:
   a counting unit, configured to judge whether the first block of the current image is in a low environmental light state according to a comparison result between a first average of the first block of the current image and an environmental light threshold value, and accumulates a state count when the first block of the current image is in the low environmental light state; and
   a majority decision unit, coupled to the counting unit, configured to generate a second control signal to interrupt the motion detection process when the state count is greater than a third threshold value, and judge whether the first block of the current image is in the static state according to states of a predetermined proportion of the image blocks of the current image, so as to generate the first control signal.

17. The image processing apparatus as claimed in claim 16, wherein the majority decision unit further judges whether the first block of the current image is in the static state according to the image blocks located adjacent to the first block of the current image, so as to generate the first signal.

18. The image processing apparatus as claimed in claim 14, further comprising:
   a frame buffering module, coupled to the temporal filtering module and the difference calculation module, configured to store the first block of the processed current image, and provide the first block of the previous image to the difference calculation module.

19. The image processing apparatus as claimed in claim 14, wherein temporal filtering module performs weight calculations to the pixels contained within the first block of the current image respectively with the pixels contained within the first block of the previous image.

* * * * *